United States Patent
Bruchiel

(10) Patent No.: US 9,653,774 B2
(45) Date of Patent: May 16, 2017

(54) SYSTEM AND METHOD FOR ACCURATELY DIRECTING ANTENNAS

(76) Inventor: Tomer Bruchiel, Azor (IL)

(*) Notice: Subject to any disclaimer, the term of this patent is extended or adjusted under 35 U.S.C. 154(b) by 1205 days.

(21) Appl. No.: 13/519,294

(22) PCT Filed: Dec. 30, 2010

(86) PCT No.: PCT/IL2010/001094
§ 371 (c)(1),
(2), (4) Date: Jun. 26, 2012

(87) PCT Pub. No.: WO2011/080742
PCT Pub. Date: Jul. 7, 2011

(65) Prior Publication Data
US 2012/0319895 A1 Dec. 20, 2012

(30) Foreign Application Priority Data
Dec. 13, 2009 (IL) .......................................... 203105

(51) Int. Cl.
*G01S 19/53* (2010.01)
*H01Q 1/12* (2006.01)
(Continued)

(52) U.S. Cl.
CPC .............. *H01Q 1/125* (2013.01); *H01Q 3/04* (2013.01); *G01S 19/53* (2013.01); *H01Q 3/08* (2013.01)

(58) Field of Classification Search
CPC .. H01Q 3/04; H01Q 3/08; H01Q 3/00; H01Q 1/125; G01S 19/53
(Continued)

(56) References Cited

U.S. PATENT DOCUMENTS 6,282,362 B1 * 8/2001 Murphy .............. H04N 5/9201
348/231.3
6,559,806 B1 * 5/2003 Watson ................... H01Q 3/02
343/758
(Continued)

FOREIGN PATENT DOCUMENTS

CN 1972010 A 5/2007

OTHER PUBLICATIONS

European Supplemental Search Report and European Search Opinion, serial No. 10840703.2, dated May 21, 2014 (counterpart appliction).
(Continued)

*Primary Examiner* — Chuong P Nguyen
(74) *Attorney, Agent, or Firm* — Marsteller & Associates, P.C.

(57) ABSTRACT

A system for accurately directing a directional antenna, that includes a calibration system for finding the current azimuth of the antenna and a rotation sensor attached to the antenna, for measuring deviations from the current azimuth of the antenna. The calibration system includes a first GPS receiver located at the antenna's position; a second GPS receiver located adjacent to a visible object at a minimal distance from the antenna and in an arbitrary direction with respect to the first GPS receiver; rotatable optical means positioned adjacent to the antenna in an initial direction being parallel to the current direction of the antenna, the optical means being coupled to a meter for measuring the angle between the current direction and the direction to the visible object by rotating the optical means until seeing the visible object and means for calculating a first azimuth from the position of the first GPS receiver to the position of the second GPS receiver and the current azimuth of the antenna by subtracting the angle from the first azimuth.

23 Claims, 4 Drawing Sheets

(51) Int. Cl.
*H01Q 3/04* (2006.01)
*H01Q 3/08* (2006.01)

(58) Field of Classification Search
USPC .......................................... 342/357.36, 359
See application file for complete search history.

(56) References Cited

U.S. PATENT DOCUMENTS

| | | | | |
|---|---|---|---|---|
| 6,661,373 | B1* | 12/2003 | Holliday | H01Q 1/1257 342/356 |
| 6,897,828 | B2* | 5/2005 | Boucher | H01Q 1/125 343/757 |
| 7,089,099 | B2 | 8/2006 | Shostak et al. | |
| 7,180,471 | B2 | 2/2007 | Boucher | |
| 7,501,993 | B2* | 3/2009 | Boucher | G01S 19/43 343/757 |
| 8,022,885 | B2* | 9/2011 | Smoyer | H01Q 1/125 343/757 |
| 8,436,779 | B2* | 5/2013 | Clifford | H01Q 1/1207 29/600 |
| 2002/0183926 | A1 | 12/2002 | Takahashi | |
| 2006/0012777 | A1* | 1/2006 | Talbot | E02F 3/842 356/139.01 |
| 2006/0025897 | A1 | 2/2006 | Shostak et al. | |
| 2006/0031014 | A1 | 2/2006 | Sato et al. | |
| 2007/0001920 | A1 | 1/2007 | Webb et al. | |
| 2008/0012750 | A1* | 1/2008 | Austin | H01Q 1/1242 342/52 |
| 2009/0201203 | A1 | 8/2009 | Le Sage et al. | |
| 2009/0276180 | A1 | 11/2009 | Schneider et al. | |
| 2011/0225804 | A1* | 9/2011 | Clifford | H01Q 1/1207 29/593 |

OTHER PUBLICATIONS

Brown R et al: "A GPS Receiver With Built-In Precision Pointing Capability", 1990's—Decade of Excellence in the Navigation Sciences. Las Vegas, Mar. 20-23, 1990; [Proceedings of the Position Location and Navigation Symposium. (PLANS)], New York, IEEE, US, vol.—, Mar. 20, 1990, pp. 83-93.

International Preliminary Report on Patentability by IPEA/US, PCT serial No. PCT/IL2010/001094, mailed Mar. 20, 2012.

* cited by examiner

SYSTEM AND METHOD FOR ACCURATELY DIRECTING ANTENNAS

FIELD OF THE INVENTION

The present invention belongs to the field of directional antennas. More particularly, the invention relates to a method for the alignment of a directional antenna to a predetermined azimuth.

BACKGROUND OF THE INVENTION

It is well known in the field of directional antennas, such as for example cellular communication antennas, that imprecise alignment of the antenna leads to weaker signal transmission and reception to and from the required sector by the antenna and a generally smaller coverage range. This affects the quality of the information that is being transferred, especially by 3-G cellular devices. For example, this causes lower data transfer rates and more errors and interference. For cellular companies, for example, this generally results in increased operational costs and loss of incomes. The antenna can become misaligned with the predetermined direction in which it is supposed to point due to initial inaccurate alignment, lack of accurate direction measurements during realignment to the same or a different direction, and due to multiple gradual or sudden external factors such as wind, rain and intentional or unintentional actions of people in its vicinity.

Typically, antennas are aligned by technicians who arrive to the site where the antenna is located. Prior art alignment methods mainly rely on external references having known geodetic coordinates. Considerable use is also made of magnetic compasses. According to an exemplary common practice, the alignment is carried out by a first technician who climbs the antenna tower and rotates an antenna that is pivotally attached to a typically vertical axle. A second technician directs him from the ground using binoculars with a built in compass, in order to determine the required pointing direction for the antenna.

Some most recent prior art methods and systems started to use GPS (Global Positioning System) signals. GPS positioning data signals can be used to accurately determine an azimuth direction or azimuth (the angle between any horizontal vector on the surface of the Earth and the meridian passing through the true North), by processing the longitude and latitude parameters of two different locations where GPS readings are taken and using, for example, the great circle method. Dedicated equipment or readily available computer software, like for example the GPS Utility Program, can be used to process such double GPS positioning data and provide accurate azimuth information.

U.S. Pat. No. 6,897,828 to Boucher teaches a method of aligning an antenna within a predetermined azimuth direction, by processing positioning data from at least one GPS receiver dish that is connected to the antenna and locatable at predetermined first and second positions away from the antenna. The receiver dish is used to determine an antenna azimuth and then moved towards the predetermined azimuth so as to align the antenna.

U.S. Pat. No. 7,180,471 also to Boucher describes a system and method of aligning an antenna with a predetermined azimuth direction. Positioning data, received by a GPS receiver dish locatable at predetermined first and second positions away from the antenna, is processed in conjunction with a reference tool that is connected to the GPS receiver dish and operatively coupled to at least two reference targets affixed to the antenna. The receiver dish is used to determine an antenna azimuth and then moved towards the predetermined azimuth, so as to align the antenna with the help of the reference tool and reference targets.

However, the above and other prior art systems suffer from a number of disadvantages:

1. As is well known, the direction of the Earth's magnetic North is not identical to the direction of the true North (which corresponds to the Earth's rotational axis). Thus, while a cellular network, for example, is planned on maps aligned with the direction of true North, its physical alignment is currently carried out by a magnetic compass, which shows the magnetic North. This introduces an inherent error into the alignment process, which is further difficult to correct because the Earth's magnetic field is non-uniform and its direction can vary by many degrees at different locations on the Earth's surface.
2. The common practice of using compasses is further problematic due to the potentially strong electromagnetic fields near antenna towers and could deteriorate the reading of a compass. As a result of this interference as well as the misalignment of the magnetic North with the true North, the typical antenna misalignment due to alignment by technicians using magnetic compasses is in the range of 5-20 degrees, depending on the skill of the technicians who carry out the alignment. And the total misalignment of an antenna is typically in the 10-30 degree range.
3. The use of computerized engineering design tools requires precise network parameters (location, altitude, type and direction of each antenna and other data). Today, for cellular networks for example, the initially inaccurate parameters are manually fed into the computer, which causes faults and lack of live, or at least daily, updates. In time, this situation leads to considerable discrepancies between the computer records and the actual antenna pointing directions in field, thus making it nearly impossible for a communication or cellular engineer to optimally design the communication network, and might require extra redundancy in the form of more antenna towers for example, resulting in higher costs.
4. Inaccuracies in the pointing directions of antennas in the field are likely to lead to poor reception and transmission coverage. While these problems were less critical in the past, they become very critical factors for modern day communications which increasingly use massive wideband digital data transmission, such as multimedia content and Internet browsing. Poor coverage leads not only to interference, but also to reduced data transfer rates and errors. This further translates into higher operating costs and loss of incomes for communications and cellular companies and the end-users.
5. Due to environmental issues related to the electromagnetic radiation emitted by the antennas, especially in the more concentrated form for directional antennas, such as cellular antennas, every field deployed antenna receives a separate permit for its installation and operation. Inherent inaccuracies in an antennas pointing direction reduce the range of possible installation sites and locations, and pointing direction inaccuracies during operation of an antenna can affect its permit and cause general legal problems to the transmission site and/or communication companies.

6. Solutions involving mounting complex systems proximate to antenna/s that can find its azimuth are usually impractical and involve very high costs and other complications.

It is therefore an object of the present invention to provide a system and method for accurately directing antennas, and which overcomes the problems associated with the prior art.

It is an object of the present invention to enable accurate direction of antennas.

It is another object of the present invention to enable accurate direction of antennas that is not susceptible to errors in the calibration process due to the Earth's non-uniform magnetic field.

It is yet another object of the present invention to enable accurate direction of antennas that is not susceptible to the electromagnetic interference that the antennas often cause.

It is a further object of the present invention to enable better and simpler engineering and design of antenna based communications networks.

It is an optional object of the present invention to enable simpler and accurate subsequent redirections of an antenna after only one uncomplicated initial calibration procedure.

It is another optional object of the present invention to enable accurate and simple monitoring of the pointing direction of an antenna.

It is a further object of the present invention to reduce costs, boost performance, reduce negative environmental impact and generally improve the operation of antenna based communication networks.

Other objects and advantages of the invention will become apparent as the description proceeds.

SUMMARY OF THE INVENTION

The present invention is directed to a system and method for accurately directing antennas. Use is made of a GPS receiver sequentially positioned adjacent to the antenna and at a distance from it, or two GPS receivers positioned at those two different locations, for finding an arbitrary azimuth. A rotatable optical means mounted adjacent to the antenna, such as for example a theodolite or even just a simple telescope with a horizontal rotation sensor, is rotated from an initial position, that is pre-aligned along the direction in which the antenna is pointing, to the arbitrary azimuth determined by means of the GPS receiver/s and marked at the location of the distanced GPS receiver. The relative angle between the arbitrary azimuth and the direction in which the antenna is pointing is thus measured and the azimuth of the latter can be determined. A rotation sensor is then used to calibrate the antenna by rotating it so that it is directed in the direction of predetermined azimuth as required.

Optionally, the rotation sensor (such as a potentiometer for example) is permanently attached to the antenna, and is calibrated to the antenna's initial azimuth and afterwards used to provide continuous indication of its updated azimuth. Knowledge of the antenna's azimuth enables its accurate and time-efficient redirection at any time and without the need to perform any further measurements.

The system for accurately directing antennas may include:
a. An initial calibration system, including:
   One or two GPS receivers.
   Rotatable optical means positioned adjacent to the antenna and used to at least locate a mark.
   Means for finding an azimuth from two GPS location readings.
b. A rotation sensor attached to the antenna.

In an embodiment, the rotation sensor is permanently attached to the antenna, so that it provides continuous indication of its azimuth after the initial calibration.

In an embodiment, the system further includes communication means coupled to the rotation sensor, for transmitting the azimuth indication provided by the rotation sensor to a remote monitoring station.

In an embodiment, the permanently attached rotation sensor may further include a GPS receiver.

In an embodiment, the rotation sensor includes a potentiometer.

In an embodiment, the means for finding an azimuth from two GPS location readings is integrated as part of at least one of the one or two GPS receivers.

In an embodiment, the means for finding an azimuth from two GPS location readings is one of:
a. A specialized device that forms an additional component of the initial calibration system.
b. A standard electronic device with adequate software.

In an embodiment, the optical means further includes a rotation sensor.

In an embodiment, the GPS receiver or the rotation sensor include at least one of:
a screen;
a keyboard;
a touch-screen.

In an embodiment, the present invention may be combined with existing antenna tower mounted equipment, such as for example, RET (Remote Electric Tilt) systems.

The present invention is also directed to a method for accurately directing antennas, including the steps of:
a. Acquiring first GPS data of a first location which is at a distance from the antenna and within line of sight of an optical means located adjacent to the antenna.
b. Acquiring second GPS data of a second location which corresponds to the location of the antenna.
c. Using the second and first GPS data to find a first azimuth between the second and first locations.
d. Aligning an optical means that is located adjacent to the antenna along a first direction that is parallel to the pointing direction of the antenna.
e. Realigning the optical means along a second direction by locating a mark adjacent to the first location.
f. Measuring the angle between the first and second directions.
g. Calculating a second azimuth, which corresponds to the pointing direction of the antenna, by means of at least the first azimuth, the angle and possibly corrections for the adjacencies.
h. Calibrating the antenna and a rotation sensor attached to the antenna to the second azimuth.

In an embodiment, the method further includes, whenever redirection of the antenna is required, rotating the antenna according to the required azimuth based on the azimuth indication provided by the rotation sensor.

In an embodiment, the method further includes remotely monitoring the pointing direction of the antenna by means of the azimuth indication provided by the rotational sensor.

BRIEF DESCRIPTION OF THE DRAWINGS

The above and other characteristics and advantages of the invention will be better understood through the following illustrative and non-limitative detailed description of embodiments thereof, with reference to the appended drawings, wherein.

DETAILED DESCRIPTION OF EMBODIMENTS

Figure 1:
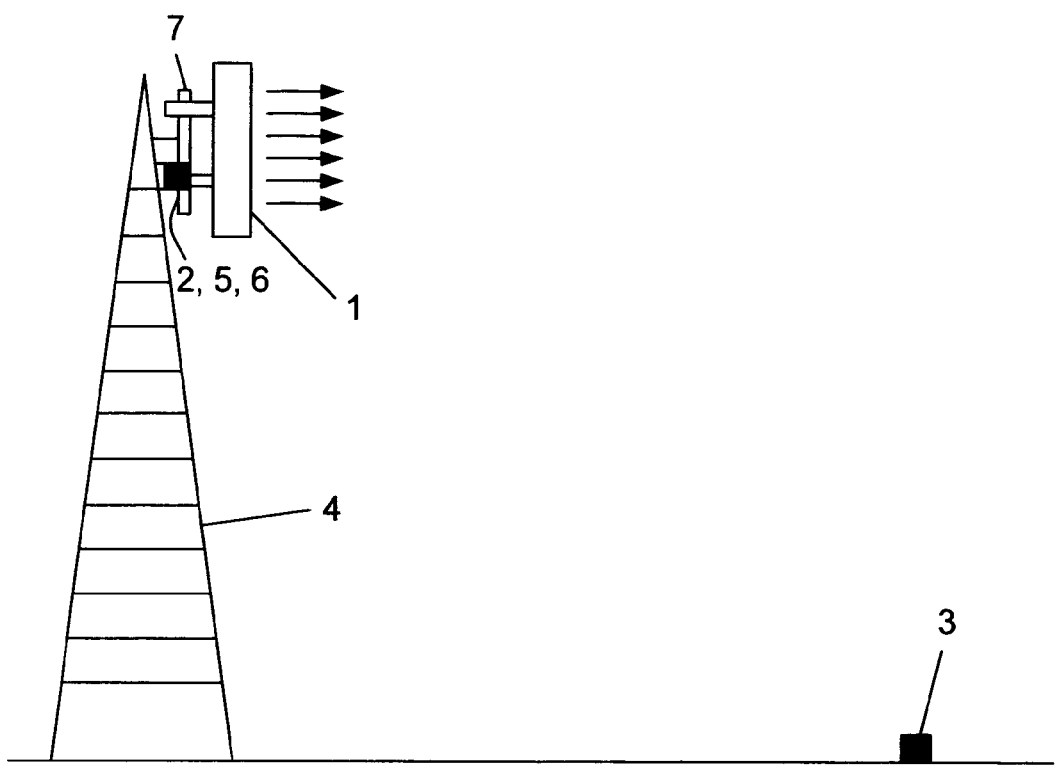
FIG. 1 schematically illustrates an embodiment of the present invention.

FIG. 1 schematically illustrates an embodiment of the present invention. A directional antenna 1 is pivotally attached to a vertical axle 7 which is mounted on an antenna tower 4. Antenna 1 has its primary transmission direction marked by the corresponding arrows. FIG. 1 illustrates an initial state when the system is used to carry out the initial calibration. A first GPS receiver 2 is positioned adjacent to antenna 1 as well as optical means 6, and a second GPS receiver 3 is positioned at a distance from antenna tower 4. Rotation sensor 5 is attached to antenna 1.

Optionally, rotation sensor 5 is intended to remain attached to antenna 1 for the duration of the operational life of antenna 1, barring possible faults. For such a case, there is a possibility that antenna 1 is originally manufactured to include some of the system's components, at least including rotation sensor 5.

To perform initial direction of the antenna 1 to a predetermined azimuth, the azimuth must first be effectively found by technicians in the field. As previously mentioned, in prior art this is typically achieved through optical means relying on local geographical references and coupled to a magnetic means such as a compass. The antenna 1 is then pointed in the required direction.

The present invention performs the initial direction of the antenna 1 by first accurately finding the azimuth of the actual initial pointing direction of antenna 1, which can even be entirely random, and then rotating the antenna 1 to the required azimuth by the precise angular difference between them which can be measured by means of the rotation sensor 5. Optionally, rotation sensor 5 may also be later used to monitor the antenna pointing direction continuously.

Figure 2A:
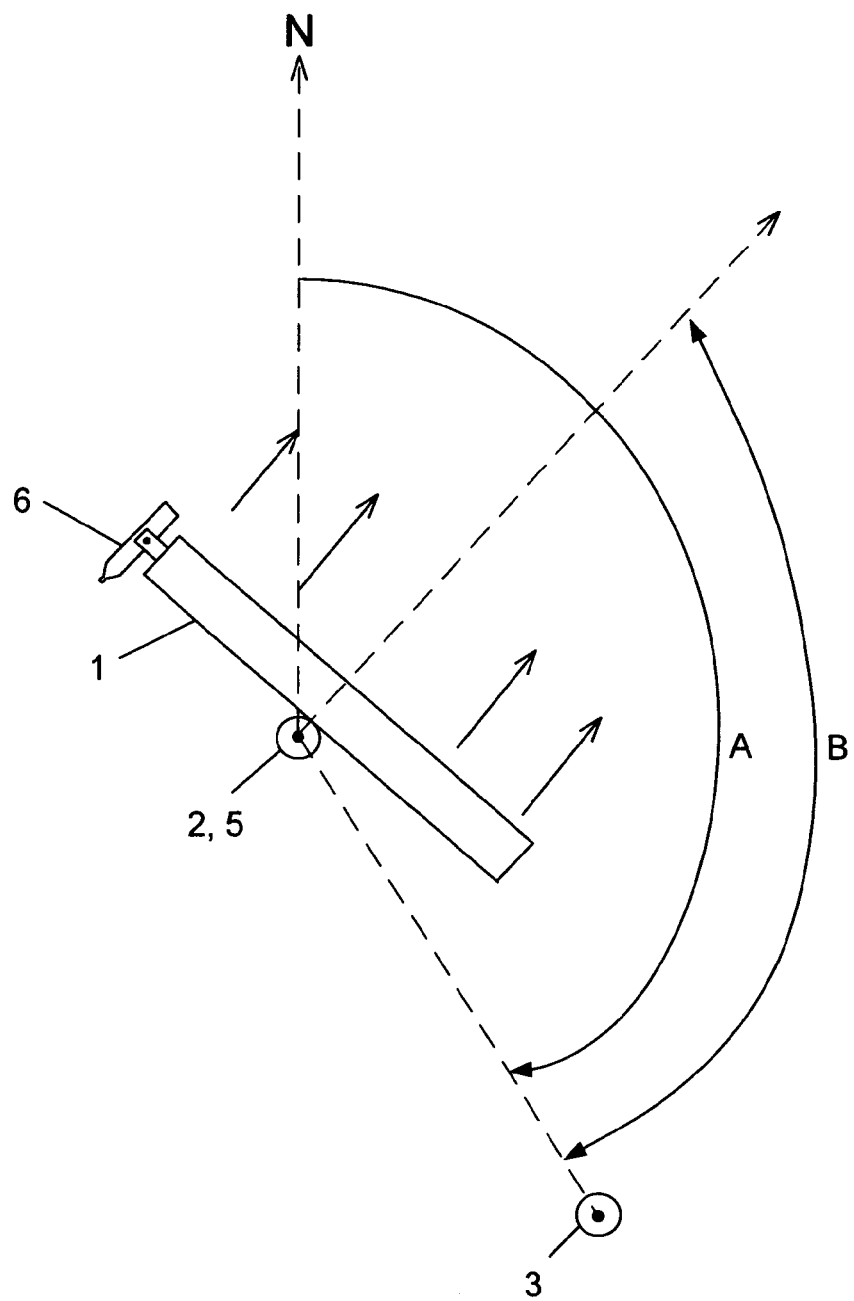
FIG. 2a schematically illustrates an embodiment of the present invention.
Figure 2B:
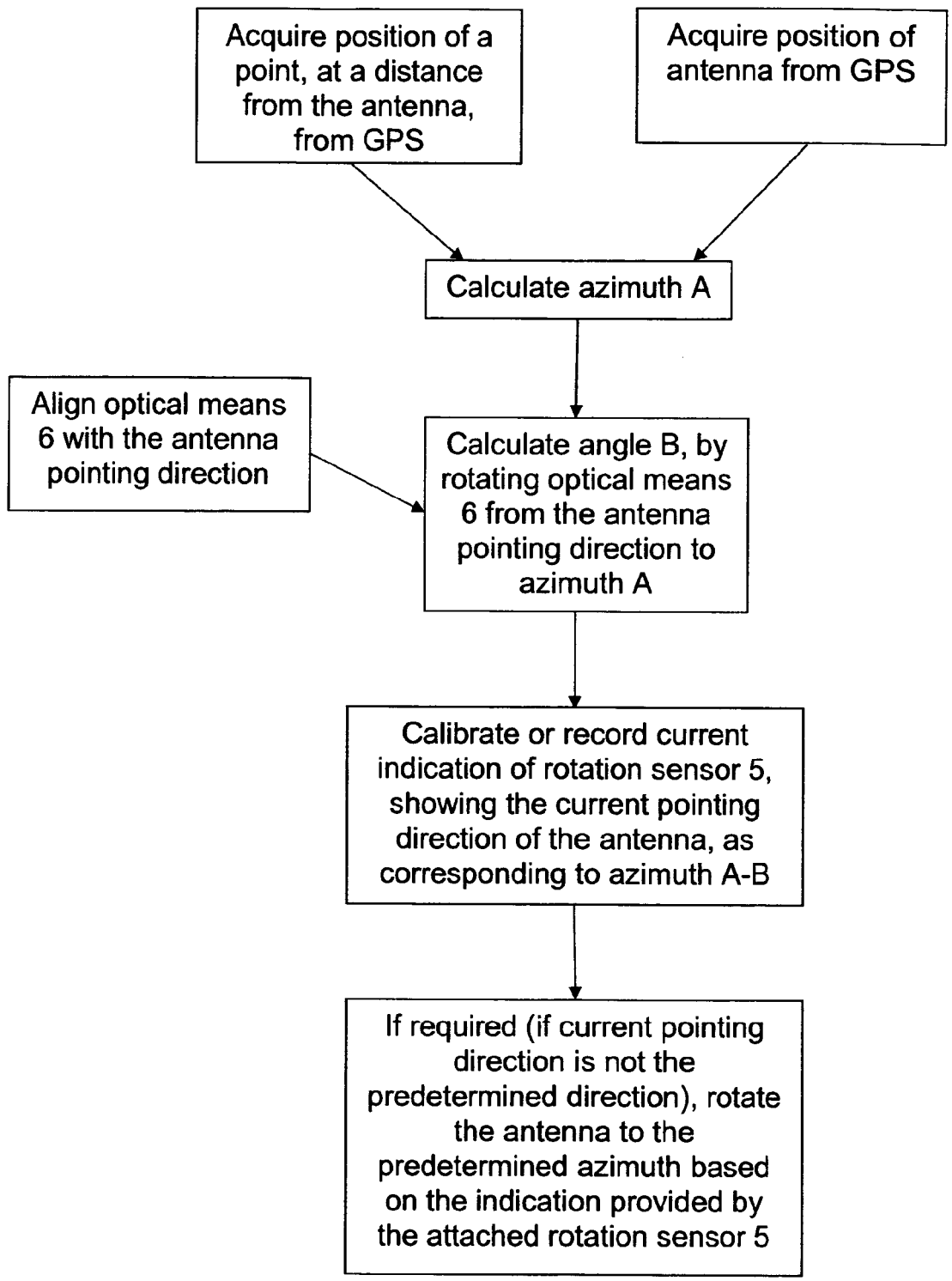
FIG. 2b illustrates a flow-diagram with the method of the present invention.

FIG. 2a schematically illustrates an embodiment of the present invention and FIG. 2b illustrates a flow-diagram with the method of the present invention. The azimuth of the initial pointing direction of antenna 1 is found by first receiving positioning data by means of GPS receivers 2 and 3. The positioning data is then processed so as to provide the azimuth A (accordingly marked in FIG. 2) in which both GPS receivers 2 and 3 are positioned, and which, due to the adjacency of first. GPS receiver 2 to the antenna 1, is practically identical to the azimuth in which both the antenna 1 and GPS receiver 3 are positioned. Vertical components, due to altitude differences between the GPS receivers 2 and 3, as well as antenna 1 and GPS receiver 3 or a mark adjacent to its location, can be neglected in the vast majority of cases due to the fact that they typically have insignificant effect on the various directional calculations carried out by the proposed system. For example, the typical distance between GPS receivers 2 and 3 should be more than 100 meters in order to find azimuth A with sufficiently high accuracy. Of course, this minimum distance is a product of the currently readily available capabilities of the GPS, and is thus not intended to limit the invention in view of future improvements in this technology or alternative global navigation satellite systems.

It should be understood, that the steps of acquiring GPS positioning data adjacent to the antenna and at a distance from it may be carried out in any order by the same GPS receiver or in parallel—by means of two GPS receivers 2 and 3.

The next or a parallel step is performed by using a rotatable optical means 6 that includes or is coupled to a rotation sensor and positioned adjacent to the antenna 1. Initially the optical means 6, which could for example be a simple monocular coupled with a simple mechanical goniometer as would be readily apparent to those skilled in the art, is aligned with the pointing direction of the antenna 1. The rotational sensor of the optical means 6 is then calibrated accordingly, or a reading of its angular position indicator is recorded by the antenna technician. Afterwards, the optical means 6 is rotated until it points in the direction of second GPS receiver 3, or a physical mark of some sort at the present or past (during the taking of a GPS reading) location of receiver 3. The mark can be, for example, a special sign of some sort, a tree, a building corner and the like. The angle B between the pointing direction of antenna 1 and the direction of azimuth A from antenna 1 can now be found by means of the angular indication of the rotation sensor that is included or coupled to the optical means 6.

As a result, the azimuth of the pointing direction of the antenna 1 can now be found by simply subtracting angle B from azimuth A. Angle B can of course be positive or negative, depending on the direction in which the rotation sensor of the optical means 6 is rotated (positive for clockwise and negative for counterclockwise rotation). Rotation sensor 5 can now be calibrated as required, for example, to the direction of true North or the predetermined pointing direction of the antenna 1. Alternatively, its calibration can be performed indirectly by recording its current angular reading and using it as a reference together with its now known azimuth. Antenna 1 can now be directed to the required predetermined direction, if such is not similar to its initial pointing direction, by rotating it until rotation sensor 5 indicates the necessary azimuth of the antenna's 1 pointing direction. The present invention allows reducing the error in the pointing direction of an antenna to around 1 degree immediately following the process of its direction.

It should be understood, that the rotation sensor of the optical means 6 may be an integral part of the optical means 6 or be coupled to it in the form of a separate device, which could also be rotation sensor 5 in which case there is only a need for one rotation sensor 5 to be part of the system. For a coupled device, the coupling can be mechanical. For example, a binocular can be physically and temporarily attached to the rotation sensor 5 which is affixed to the antenna, and rotated with the rotation sensor 5. Alternatively, it can be electronic through adequate wires or even wireless, as is well known in the art.

Figure 3:
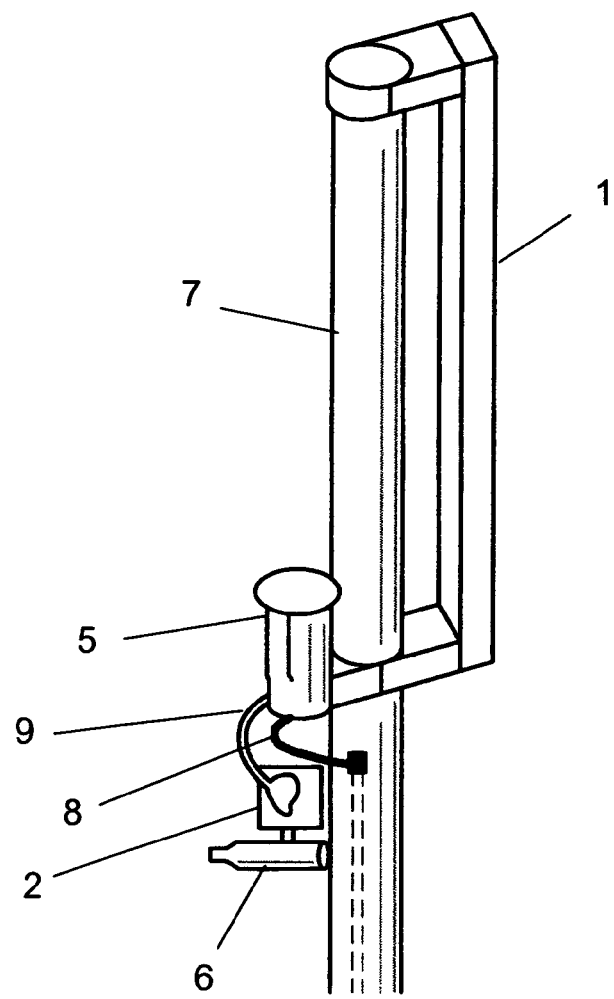
FIG. 3 schematically illustrates an embodiment of the present invention.

The first GPS receiver 2 can be separate, or for example coupled directly to rotation sensor 5 as may be seen in FIG. 3. In this configuration, wire 9 is used to electronically couple between GPS receiver 2 with attached optical means 6, and rotation sensor 5. Optical means 6 and GPS receiver 2 can further include processing means for calculating the first azimuth of the line between GPS receivers 2 and 3 and the rotation angle A of optical means 6, and for calibrating the rotation sensor 5 electronically through wire 9. In such a configuration, GPS receiver 2 and optical means 6 with its rotation sensor can be a single antenna calibration and control unit. This unit, possibly with the addition of a second GPS receiver 3, can be brought to the site by the technicians and be used to initially calibrate and direct rotation sensor 5 and antenna 1. Then they can be removed from the site for repeated use on other sites. Alternatively, rotation sensor 5, optical means 6 and GPS receiver 3 can also form a single calibration and control unit, and brought to the site repeatedly in order to perform antenna pointing direction alignment.

Another embodiment requires each antenna with permanently coupled rotation sensor 5 to be calibrated only once, barring various faults, during its lifetime. The required amount of control and calibration units can be rather small relative to the amount of serviced antennas, which is economically efficient. Also, the technicians can easily redirect the antennas whenever required by using the azimuth indication provided by rotation sensor 5, thus making this process very time efficient.

The calibration and control unit may further include a user interface wherein coordinates can be input for azimuth calculations and pointing directions are indicated, such as the required pointing direction of the antenna and its initial pointing direction. The user interface may include a screen, a touch-screen, a keyboard and the like as would be apparent to those skilled in the art.

Nevertheless, it should be understood that the system of the present invention can also function by leaving some or all of the components in addition to rotation sensor 5, such as GPS receiver 2 and optical means 6, attached to the antenna after the initial calibration procedure.

It should also be understood, that the use of two GPS receivers 2 and 3 is not necessary if just one GPS receiver is used to take GPS signal readings adjacent to the antenna and at a distance from the antenna tower 4, as previously described. In such case, the GPS signal readings can be taken sequentially and the GPS data can later be processed as required.

It should also be understood that the GPS signals can be received and processed and azimuth A can be calculated as required by a plurality of possible means, for example, by a laptop computer, a mobile phone, a specialized unit including a GPS receiver and a coupled optical means 6 with its own rotation sensor (possibly also with a coupled screen and/or touchscreen and/or keyboard). Also, the GPS position data can be used to calculate azimuth A on a remote computer having adequate software after receiving the position data from the technicians in field.

Rotation sensor 5, GPS receiver 2 and optical means 6 are typically not positioned in front of the antenna 1, so as not to be affected by or interfere with its transmissions, as well as not to expose the antenna directing technician to a radiation hazard. For example, GPS receiver 2 can also be located on the ground below the antenna 1 instead of also being raised onto the antenna tower 4, while still providing accurate position data for the calculation of azimuth A.

The azimuth indication of rotation sensor 5 can be transmitted to a remote monitoring station, such as the operations center of a cellular company. To achieve this, the azimuth indication can be electronically transmitted from rotation sensor 5 through wiring 8 as illustrated in FIG. 3. Wiring 8 can later be connected to the transmitter, typically located adjacent to the base of antenna tower 4 and coupled to one of the antennas on the tower 4 for wireless transmission of the azimuth indication. Alternatively, it can be coupled to a wired network that carries received signals from the antenna tower and thus can also provide connection to the monitoring center.

The optional remote monitoring of the antenna azimuth enables the elimination of regular antenna direction inspections by a technician crew. Only when the azimuth indication of rotation sensor 5 shows a deviation of the antenna's pointing direction from the required azimuth by a certain value (such as 5 degrees for example), a technician crew is dispatched to the site to quickly and easily redirect the antenna as required. This is done based on azimuth indication provided on-site by rotation sensor 5 and without the need for any further measurements and calculations as would otherwise be required by prior art. The monitoring procedure can be continuous, periodic or controller initiated.

The rotation sensor 5 can be implemented in several ways. It can include well known components such as a potentiometer and strain gauges or it could be mechanical. For a potentiometer, electrical power can be provided by batteries or through wiring 8 from the power supply of antenna tower 4. Signal output can be provided by a modem or an appropriate electronic communications component, as well as by an analog dial or digital display for reading by a technician on the site. Also, a user interface may be included with rotation sensor 5 or with the rotation sensor of the optical means, which can further show the required pointing direction of the antenna after its azimuth is found or perform the full functions of a calibration and control unit.

Optical means 6 can be implemented in multiple ways as would be readily apparent to those skilled in the art. As an alternative to visual means such as a monocular or binoculars with possible zoom options, optical means 6 can also consist of a laser beam emitter, implemented for example as a LED, and a reflective mirror forming the mark at the location of the distanced second GPS receiver 3.

The proposed use of non-magnetic means for finding the pointing direction of the antenna enables to achieve high accuracy that is not affected by the electromagnetic fields emanating from the antenna. It operates by locating true North rather than the magnetic North, thus clearly conforming to the maps of the terrain. The system can be employed by cellular and various communications companies, as well as antenna installation, maintenance and manufacturing companies.

By having accurate antenna azimuth inputs to work with, engineers who plan and maintain the communications network can optimize its performance as well as lower its costs. Installation in field can be more accurate with considerably smaller errors in the resulting pointing directions of the antennas. Moreover, the need for periodic verification and measurement of the antenna pointing directions is simplified and reduced, or entirely removed for a system that includes live update of the pointing directions.

Optimizing performance of communications networks in the above manner further enables decreasing the amount of antennas due to lack of need for extra-redundancy, reducing negative environmental impact, enabling installment of antennas in areas where they would not be authorized beforehand due to electromagnetic radiation hazards, and improved compliance with the conditions of antenna operation permits.

In an embodiment, the present invention may be combined with existing antenna tower mounted equipment. For example, RET (Remote Electric Tilt) systems, a plurality of which exist and are well known in the art. Or, for example, a motor such as a step motor for rotating the antenna and communication means for receiving orders from an operator to point the antenna in a required direction. For example, the rotation sensor 5 of the present invention may be combined with such an exemplary system wherein it can use its communication means to send accurate antenna pointing direction data back to the operator, when such data is available.

The proposed system may be implemented as an integral part of the backside of the antenna, such that it is fixedly attached to the non-radiating surface of the antenna.

The above examples and description have of course been provided only for the purpose of illustration, and are not intended to limit the invention. As will be appreciated by a person skilled in the art, the invention can be carried out in a great variety of ways in addition to those described above, all without exceeding the scope of the invention.

The invention claimed is:

1. A system for accurately finding a current azimuth of an antenna by non-magnetic means, comprising:
   i. a first GPS receiver located at a first position coinciding with an antenna;
   ii. a second GPS receiver located at a second position spaced by a minimal distance from said antenna and in an arbitrary direction with respect to said first GPS receiver;
   iii. rotatable optical means which is positioned adjacent to said antenna, said optical means configured to visually sight said second GPS receiver and being independently rotatable, with respect to said antenna, about a vertical axis mounted on a tower of said antenna from said initial direction to a second direction until said optical means points in the direction of said second GPS receiver;
   iv. a rotation sensor coupled to or included with said optical means and configured to measure an angle between an initial direction that is parallel to a current pointing direction of said antenna and said second rotated direction; and
   v. processing means configured to calculate, with respect to true north as derived from said first and second GPS receivers, a first azimuth to a line between said first position and said second position, and the current azimuth of said antenna by subtracting said angle from said first azimuth.

2. A system according to claim 1, wherein the rotation sensor is permanently attached to the antenna and is also configured to measure deviations from the current azimuth of the antenna.

3. A system according to claim 1, further comprising a calibrating unit configured to direct the antenna to a desired pointing direction.

4. A system according to claim 3, wherein the calibrating unit comprises an additional rotation sensor configured to provide continuous indication of the current azimuth of the antenna after an initial calibration.

5. A system according to claim 4, wherein the additional rotation sensor is also configured to provide the calibrating unit with continuous indication of the current azimuth of the antenna after an initial calibration.

6. A system according to claim 3, further including communication means coupled to the additional rotation sensor, configured to transmit the azimuth indication provided by said additional rotation sensor to a remote monitoring station.

7. A system according to claim 3, wherein the processing means is a specialized device that forms an additional component of the calibrating unit.

8. A system according to claim 1, wherein the rotation sensor is a potentiometer.

9. A system according to claim 1, wherein the processing means is integrated as a part of at least one of the first or second GPS receiver.

10. A system according to claim 1, wherein the first or second GPS receiver or the rotation sensor includes at least one of the group consisting of:
    a screen;
    a keyboard; and
    a touch-screen.

11. A system according to claim 1, which operates in combination with existing antenna tower mounted equipment, including RET (Remote Electric Tilt) systems.

12. A system according to claim 1, wherein one or more components selected from the group consisting of the first GPS receiver, rotation sensor, optical means and processing means are an integral part of a backside of the antenna.

13. A system according to claim 1, wherein the antenna is a directional antenna.

14. A system according to claim 1, wherein one or more components selected from the group consisting of the first GPS receiver, rotation sensor, optical means and processing means are removable from the antenna so as to be removably attached to another antenna and to be usable for finding the current azimuth of said another antenna.

15. A system according to claim 1, wherein the optical means is selected from the group consisting of a theodolite, binoculars, a telescope and a monocular coupled with a mechanical goniometer.

16. A system according to claim 1, wherein the second GPS receiver is spaced by a minimal distance of at least 100 meters from the antenna.

17. A method for accurately finding a current azimuth of an antenna by non-magnetic means, including the steps of:
    a. acquiring position data of a first location which is at a distance from an antenna;
    b. acquiring GPS data of a second location which corresponds to the location of said antenna;
    c. using data of said first and second locations to find a first azimuth to a line between said second and first locations;
    d. aligning rotatable optical means configured to visually sight said first location along a first direction that is parallel to a current pointing direction of said antenna;
    e. rotating said optical means about a vertical axis, with respect to said antenna, from a first direction that is parallel to said pointing direction to a second direction until a mark adjacent to said first location is sighted through said optical means when aligned with said second direction;
    f. measuring an angle between said first and second directions; and
    g. calculating a second azimuth, which corresponds to said pointing direction of said antenna, by subtracting said angle from said first azimuth.

18. The method of claim 17, further comprising the step of calibrating said antenna and a rotation sensor attached to said antenna to said second azimuth.

19. The method of claim 18, further comprising the step of rotating the antenna according to a required azimuth based on an azimuth indication provided by the rotation sensor, whenever redirection of the antenna is required.

20. The method of claim 19, further comprising the step of remotely monitoring the pointing direction of the antenna by means of the azimuth indication of the rotational sensor.

21. The method according to claim 17, wherein position data of the first location is indicative of location coordinates of a mark adjacent to the first location.

22. A method according to claim 17, wherein the position data of the first location that is acquired is GPS data.

23. A method according to claim 17, wherein the angle between the first and second directions is measured by a rotation sensor coupled to or included with the optical means.

\* \* \* \* \*